(12) United States Patent  
Toyofuku et al.

(10) Patent No.: US 6,741,278 B1  
(45) Date of Patent: May 25, 2004

(54) ELECTRONIC PHOTOGRAPHING DEVICE

(75) Inventors: Toshiyuki Toyofuku, Hachioji (JP); Masafumi Yamasaki, Hachioji (JP); Nobuhide Dotsubo, Daito (JP); Masao Tamashima, Sakai (JP); Toshinobu Haruki, Kyotanabe (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/096,408

(22) Filed: Jun. 11, 1998

(51) Int. Cl.$^7$ .................... H04N 5/228; H04N 5/75; H04N 5/222
(52) U.S. Cl. .............. 348/222.1; 348/231.99; 348/231.5; 348/333.01
(58) Field of Search ................ 348/207, 231, 348/232, 239, 222, 333.01, 207.99, 222.1, 231.99, 231.3, 231.5, 333.02, 333.03, 333.05; 368/29; 345/867

(56) References Cited

U.S. PATENT DOCUMENTS

| | | | | |
|---|---|---|---|---|
| 4,540,292 A | * | 9/1985 | Rubenstein et al. | 368/29 |
| 5,633,678 A | * | 5/1997 | Parulski et al. | 348/232 |
| 5,796,428 A | * | 8/1998 | Matsumoto et al. | 348/231 |
| 5,850,220 A | * | 12/1998 | Motai | 345/867 |
| 5,900,909 A | * | 5/1999 | Parulski et al. | 348/232 |
| 5,943,050 A | * | 8/1999 | Bullock et al. | 348/333.01 |
| 6,118,480 A | * | 9/2000 | Anderson et al. | 348/207 |
| 6,195,126 B1 | * | 2/2001 | Kikuchi et al. | 348/232 |

FOREIGN PATENT DOCUMENTS

| | | | | |
|---|---|---|---|---|
| JP | 06-019395 | * | 1/1994 | 40/107 |
| JP | 7-123351 | | 5/1995 | |
| JP | 7-226881 | | 8/1995 | |

* cited by examiner

*Primary Examiner*—Ngoc-Yen Vu  
*Assistant Examiner*—Luong Nguyen  
(74) *Attorney, Agent, or Firm*—Ostrolenk, Faber, Gerb & Soffen, LLP

(57) ABSTRACT

This electronic photographing device is designed to synthesize a calendar and an image with each other by a simple operation so as to record the synthesized image on a recording medium. To provide this electronic photographing device, this invention includes a recording medium (33), an operation switch (11, 12, 13, or the like) for selecting predetermined image data from the image data corresponding to a plurality of images recorded on the recording medium (33), a calendar signal generation circuit (36) for generating a calendar signal, a liquid-crystal display unit (17) for displaying an image corresponding to the image data selected by the operation switch and a calendar image corresponding to the calendar signal generated by the calendar signal generation circuit, an operation member for setting the display form of the image and the calendar image displayed on the liquid-crystal display unit into a predetermined form, and a recording medium control circuit (31) for recording image data corresponding to an image obtained by synthesizing the image and the calendar image displayed on the liquid-crystal display unit on the recording medium.

16 Claims, 12 Drawing Sheets

ELECTRONIC PHOTOGRAPHING DEVICE

BACKGROUND OF THE INVENTION

1. Field of the Invention

The present invention relates to an electronic photographing device and, more particularly, to an electronic photographing device which is designed such that the image data of a calendar is formed by using an image photographed by an electronic photographing device to record the image data of the calendar on a recording medium.

2. Related Background Art

Conventionally, a device which displays or prints (prints out) the image data of a calendar by using an image photographed by an electronic photographing device has been proposed. For example, a video printer described in Japanese Unexamined Patent Publication No. 7-123351 relates to a device which receives static image data of one of a plurality of video images reproduced by a video recorder, synthesizes the static image data with designated calendar data to form the image data of a calendar, and prints the calendar image.

However, since the incorporation of this capability greatly increases the size of the device such that the device cannot be easily used by a user as an electronic photographing device.

In addition, in this prior art, a user selects an image representing a picture which is limited in the manner of presentation of the image. When this image is synthesized on calendar data, calendar designs such as the arrangement angle of a rotation direction and the selection of the year and month in a calendar, or operability during formation of the calendar have not been sufficiently considered.

SUMMARY OF THE INVENTION

The present invention provides an electronic photographing device in which, by using image information photographed by a camera serving as an electronic photographing device and recorded on a recording medium loaded in the camera which is the same camera used in the photographing, the image and a calendar can be synthesized with each other by a simple operation.

The present invention also provides an electronic photographing device in which the format of a calendar image can be arbitrarily arranged by simple operation, for example, the selection of photographed images, the change/selection of designs, such as the rotation angle, for arranging the image, the year and month of a calendar, and a position where Sunday is arranged in the calendar, can be arbitrarily set.

In short, this invention is an electronic photographing device including photographing means for photographing an object and a recording medium on which image data corresponding to a plurality of images photographed by the photographing means can be recorded, comprising: selection means for selecting predetermined image data from the image data corresponding to the plurality of images recorded on the recording medium; calendar signal generation means for generating a calendar signal; display means for synthesizing an image corresponding to the image data selected by the selection means with a calendar corresponding to the calendar signal generated by the calendar signal generation means to display a synthesized image; operation means for setting the display form of the image or calendar displayed on the display means into a predetermined form; and recording means for recording synthesized image data corresponding to the synthesized image between the image and calendar displayed on the display means.

These benefits of the present invention and other objects and other benefits of the present invention will be apparent from the following detailed description.

BRIEF DESCRIPTION OF THE DRAWINGS

FIG. 4 is a view showing a state wherein the electronic photographing device in FIG. 1 is connected to a personal computer, a digital recorder, a printer, and the like.

DETAILED DESCRIPTION OF THE PREFERRED EMBODIMENTS

The entire arrangement of an electronic photographing device (to be referred to as a "camera" hereinafter) according to an embodiment of the present invention and the operation of the camera will be described below.

In the following description, for descriptive convenience, a simple calendar is defined as a calendar constituted by letters and numbers without any image. In contrast to this, a synthesized calendar is defined as a calendar formed by performing a synthesizing process to an image or the like photographed by the camera according to this embodiment.

Figure 1:
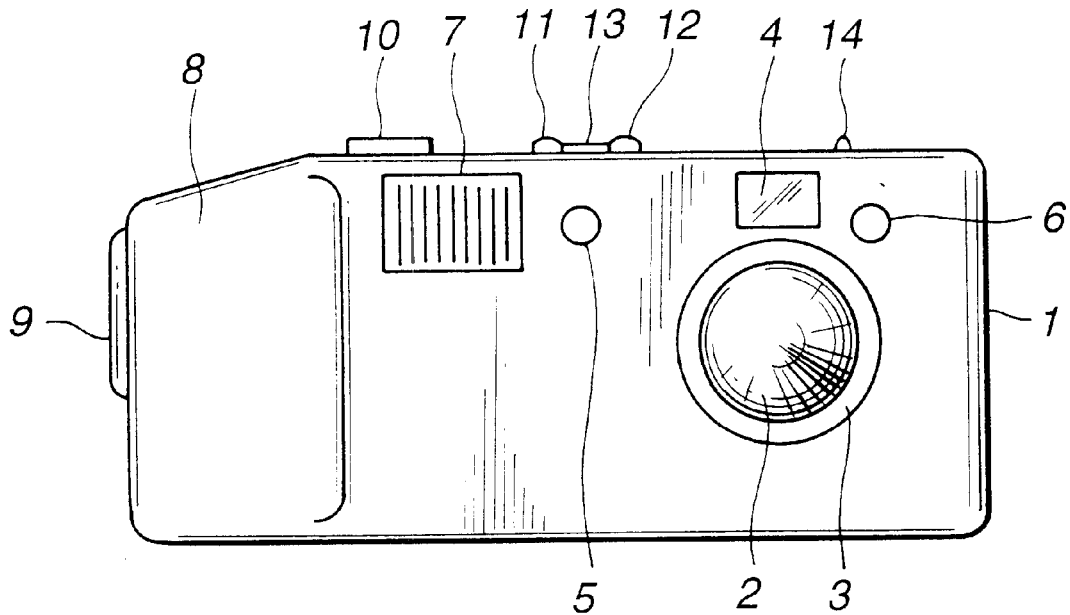
FIG. 1 is a front view showing the appearance of an electronic photographing device according to an embodiment of the present invention.

In this camera according to this embodiment, a photographing lens 2 held by a lens mirror cylinder 3 is arranged at a right-side position of the almost central portion on the front surface of a camera body 1 as shown in FIG. 1. An optical finder objective unit 4 is exposed to the upper side of the photographing lens 2, and distance measurement lenses 5 and 6 are arranged on the left and right sides of the optical finder objective unit 4 and are spaced apart from each other by a predetermined base length. An electric-flash device 7 for illuminating an object is arranged on the left side of the distance measurement lens 5, and a grip portion 8 for holding the camera body 1 is arranged on the left side of the electric-flash device 7. A strap fixing portion 9 is arranged on the side surface of the grip portion 8.

Figure 2:
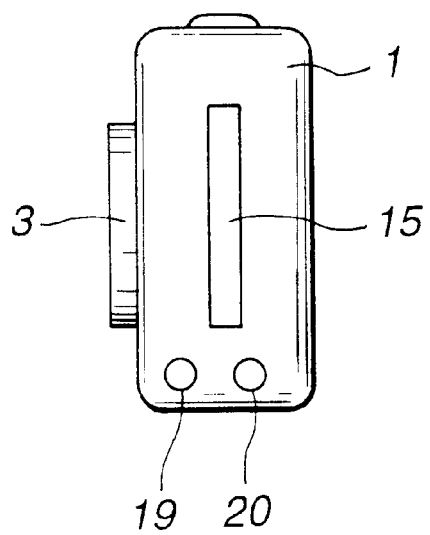
FIG. 2 is a side view showing the appearance of the electronic photographing device in FIG. 1.

On the side surface of the camera body 1 opposing the grip portion 8, as shown in FIG. 2, a recording medium insertion/extraction port 15 is provided for inserting/removing a recording medium 33 (see FIG. 5) serving as a recording means which is detachably set. On the lower side of the recording medium insertion/extraction port 15, a video output terminal 19 for connecting the camera to the external display device such as a monitor television or the like, and a data input/output terminal 20 or the like for connecting the camera to an external machine such as a printer or a personal computer (to be referred to as a PC hereinafter), and the like are formed.

On the other hand, arranged on the upper surface of the camera body 1 are a release switch 10; an increment switch 11 for updating a set numeral value such as a date to increase the value; a decrement switch 12 for updating a set numeral value or the like to decrease the value; a fixing switch 13 for fixing the set numeral value (data) such as a date selected by the increment switch 11, the decrement switch 12, or the like; an operation switch such as a mode selection switch 14 for selecting a predetermined operation mode from various operation modes of the camera; a liquid-crystal display unit 16 for displaying mode information or the like selected by the mode selection switch 14. For the various operation switches, automatic-reset switches are used in a preferred embodiment of the present invention.

Figure 3:
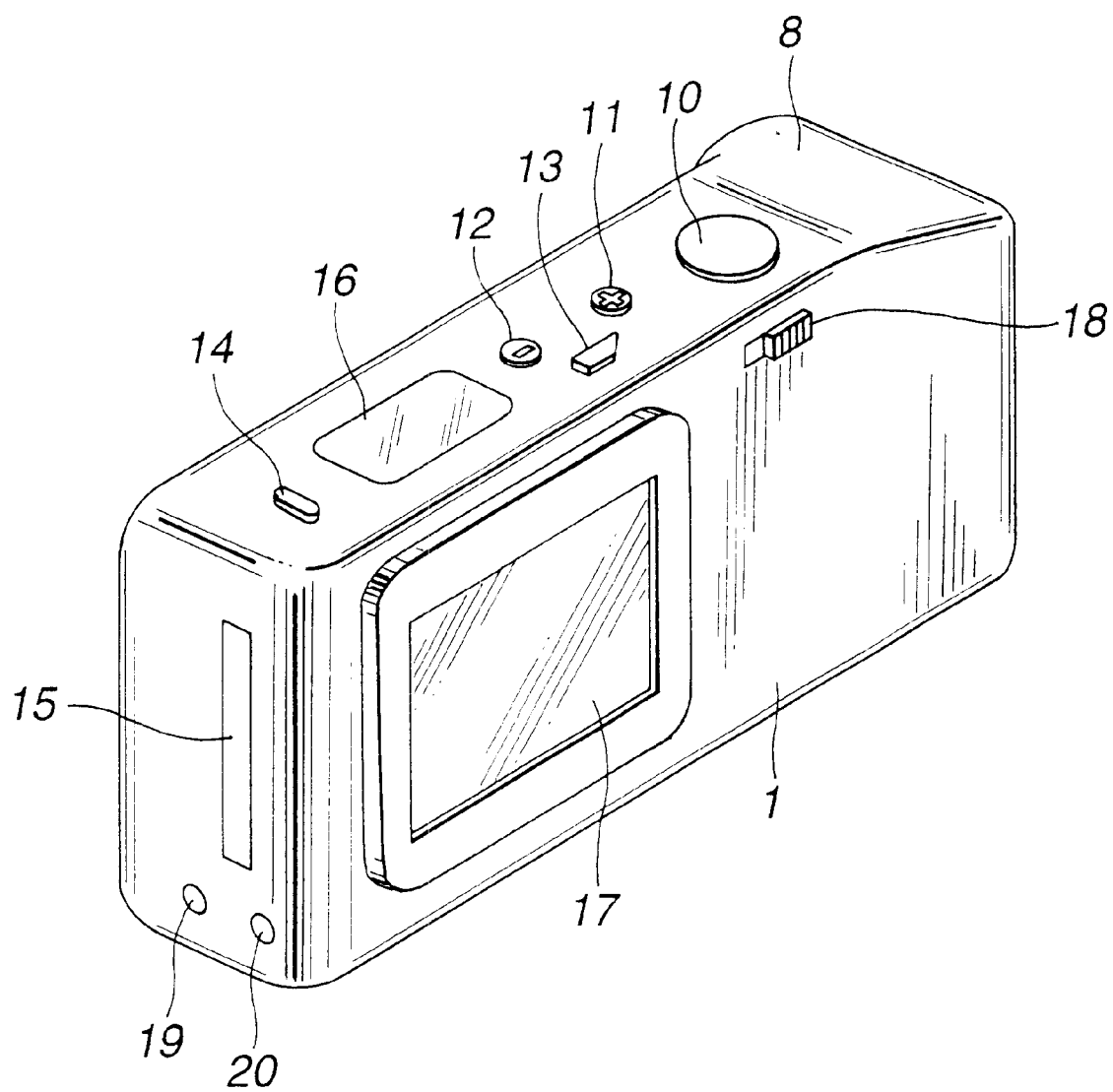
FIG. 3 is a perspective view showing the appearance of the electronic photographing device in FIG. 1 when viewed from the rear of the electronic photographing device.

Arranged on the rear surface of the camera body 1 are a liquid-crystal display unit 17 for displaying information or the like, which is required for a predetermined editing operation performed by the camera such as a date selected by the increment switch 11 or the decrement switch 12 or an image photographed by the camera. A power supply switch 18 for supplying a power to the camera to turn on the camera is arranged on the upper right portion on the rear surface of the camera of a preferred embodiment body 1. In the camera, a slide switch is used as the power supply switch 18 as shown in FIG. 3.

Figure 4:
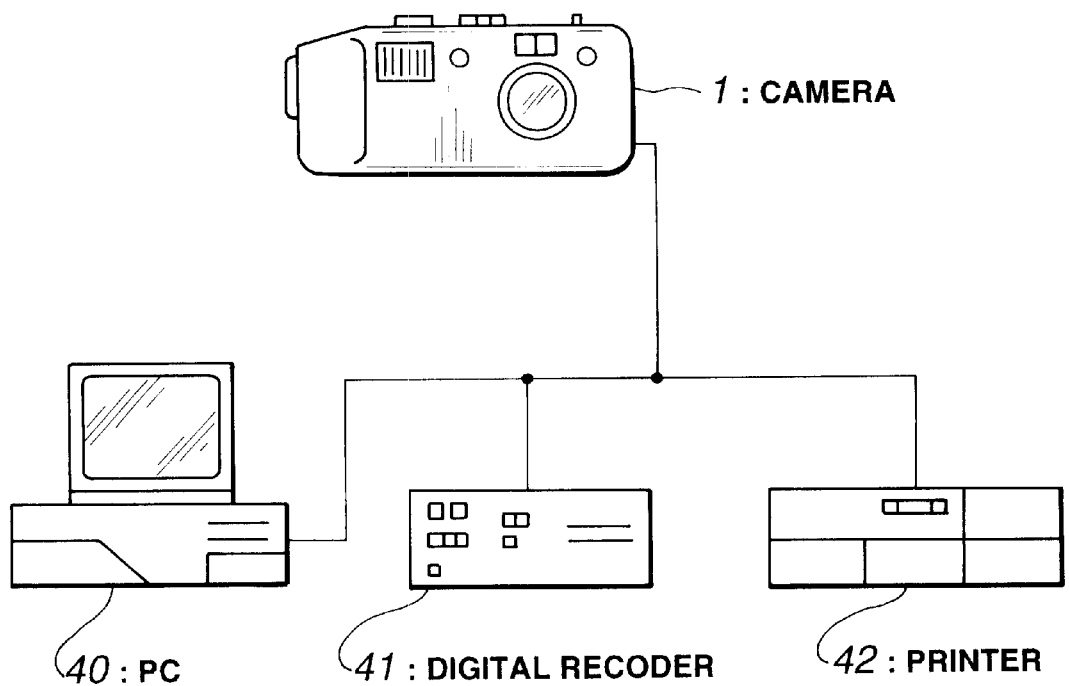

The camera arranged as described above is designed to be connected to a PC 40 through a data input/output terminal 20 as shown in FIG. 4, so that various image processes or the like which cannot be performed by only the camera can be executed as needed.

The camera is similarly connected to a digital recorder 41 through the data input/output terminal 20. At this time, the camera outputs a large amount of image data photographed by the camera and recorded on the recording medium 33 (see FIG. 5) to the digital recorder 41, so that the image data can be recorded. When the digital recorder 41 and the PC 40 are connected to each other to connect the camera to the PC 40, photographed image data of the recording medium 33 on the camera side can be similarly recorded on the digital recorder 41 through the PC 40.

The camera is also connected to a printer 42 through the data input/output terminal 20. This printer 42 is a device for printing an image or the like corresponding to image data recorded on the recording medium 33 on the camera side. When the printer 42 is connected to the PC 40, an image or the like corresponding to image data or the like subjected to various image processes in the PC 40 can be printed.

Figure 5:
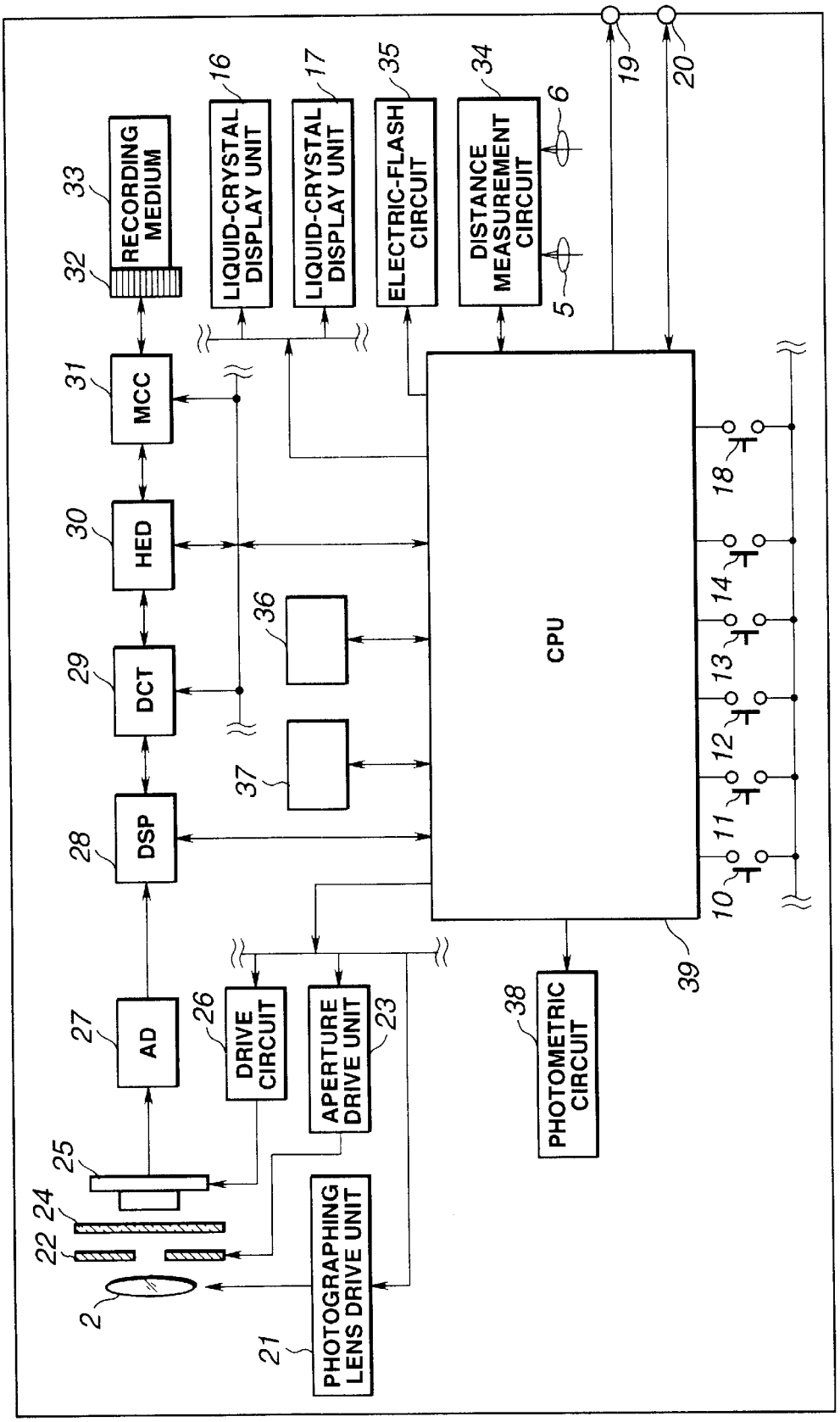
FIG. 5 is a block diagram showing a main electric arrangement of the electronic photographing device in FIG. 1.

The electric main components of the camera according to the embodiment of the present invention will be described below by using the block diagram of FIG. 5. The same reference numerals as in FIGS. 1 to 3 denote the same components shown in FIG. 5.

The photographing lens 2 is arranged to form an object image on the photographing surface of the solid state imaging element 25 arranged behind the photographing lens 2. The photographing lens 2 is mechanically connected to a photographing lens drive unit 21. This photographing lens drive unit 21 drives the photographing lens 2 to a predetermined position such that a clear object image is always formed on the photographing surface of the solid state imaging element 25 on the basis of the distance to an object measured by a distance measurement circuit 34 (to be described later).

An aperture 22 arranged behind the photographing lens 2 has an aperture function of adjusting a depth of field and an amount of exposure for the solid state imaging element 25 and a shutter function of determining a shutter speed. This aperture 22 is mechanically connected to a aperture drive unit 23. The aperture drive unit 23 drives the aperture 22 on the basis of a command signal from a control means (to be referred to as a CPU hereinafter) 39 such as a CPU (Central Processing Unit) for controlling the entire camera to set a predetermined numeral aperture and a predetermined shutter speed.

An optical low-pass filter 24 for preventing reflected distortion or the like from being generated in a video signal is arranged behind the aperture 22.

The solid state imaging element 25 is arranged behind the optical low-pass filter 24 as described above. A drive circuit 26 is connected to the solid state imaging element 25, and the drive circuit 26 is electrically connected to the CPU 39. The drive circuit 26 is controlled on the basis of a signal from the CPU 39 so as to generate a timing signal for storing charges generated in pixels constituting the solid state imaging element 25 for a predetermined period of time, a signal for reading the stored signal at a predetermined timing, and the like.

On the other hand, the output terminal of the solid state imaging element 25 is connected to the input terminal of an A/D converter 27. In this manner, an analog output signal from the solid state imaging element 25 is input to the A/D converter 27 and converted into a digital signal by the A/D converter 27. This digital signal is sent to a Digital Signal Processor (to be referred to as a DSP hereinafter) 28 connected to the A/D converter 27. The DSP 28 is a processor for dividing the digital signal into a color-difference signal and a luminance signal to perform correction and a compression process or an expansion process for image data.

The output terminal of the DSP 28 is connected to a Discrete Cosine Transform (to be referred to as DCT hereinafter) circuit 29. In the DCT circuit 29, orthogonal transformation which is one process of image compression/expansion processes in accordance with the JPEG (Joint Photographic Experts Group) scheme is performed. The DCT circuit 29 is connected to a Huffman Encoder/Decoder (HED) circuit 30. In this Huffman Encoder/Decoder circuit 30, a predetermined process which is one process of image compression in accordance with the JPEG scheme is performed. With the Huffman encoding/decoding process performed here, a high-efficient image compression/expansion process can be performed.

The output terminal of the Huffman encoder/decoder circuit 30 is connected to a Memory Control Circuit (MCC) 31. The output terminal of this memory control circuit 31 is connected to the recording medium 33 through a connector 32.

The memory control circuit 31 is arranged to control a data recording operation of the recording medium 33, a reading operation of recorded data from the recording medium 33, and the like. In this embodiment, as a concrete example of the recording medium 33, a memory card which is detachably loaded in the camera is used.

A distance measurement circuit 34 is a circuit for forming a signal for measuring a distance from the camera to an object. In this camera, the two distance measurement lenses 5 and 6 for forming an object image on a light-receiving surface of a distance measurement sensor (not shown) serving as a main component of the distant measurement circuit 34 are arranged to perform distance measurement by using the principle of triangular distance measurement. The two distance measurement lenses 5 and 6 are arranged at predetermined positions on the front surface side of the camera as described above to be spaced apart from each other by a predetermined base length.

The CPU 39 executes a predetermined process on the basis of an output signal from the distance measurement circuit 34 to calculate a distance to the object. On the basis of the calculation result, the CPU 39 sends a predetermined signal to the photographing lens drive unit 21. With this arrangement, the photographing lens drive unit 21 controls the photographing lens 2 to drive the photographing lens 2 to a predetermined position such that a focused object image is always formed on the photographing surface of the solid state imaging element 25.

The electric-flash circuit 35 is connected to the CPU 39. More specifically, the CPU 39 is a circuit which controls the electric-flash device 7 through the electric-flash circuit 35 on the basis of brightness information of the object measured by a photometric circuit 38 (to be described later) when it is determined that the object has low brightness, so that auxiliary light is illuminated on the object.

On the other hand, a calendar signal generation means 36 and a character signal generation circuit 37 are connected to the CPU 39.

Of these components, the calendar signal generation means 36 generates a calendar signal related to the image data of a calendar formed by the camera with reference to one of date information input by a camera operator, image information such as a photographing date data following the image data recorded on the recording medium 33, or the present date formed by a timer means (not shown) incorporated in the CPU 39. This calendar signal need not be incorporated in the CPU 39.

The character signal generation circuit 37 is arranged to generate a character signal including fonts such as letters, numbers, and symbols which may be required for a calendar. The character signal may be incorporated in the CPU 39.

On the other hand, the liquid-crystal display units 16 and 17 are also connected to the CPU 39. Data corresponding to a predetermined image or letter are sent from the CPU 39 to the liquid-crystal display units 16 and 17.

The video output terminal 19 and the data input/output terminal 20 are also connected to the CPU 39, and all the various operation switches 10 to 14 and 18 and the like are also connected to the CPU 39. In this manner, the CPU 39 can determine the states of the video output terminal 19, the data input/output terminal 20, and the various operation switches 10 to 14 and 18 and the like, i.e., the ON/OFF states of the terminals and the switches. The basic functions of the various operation switches have been described above in FIGS. 1 to 3.

The photometric circuit 38 is connected to the CPU 39. The photometric circuit 38 is a circuit to measure the brightness of the object prior to a photographing operation. The CPU 39 determines values such as a shutter speed on the basis of information obtained by a photometric operation by the photometric circuit 38, and determines whether auxiliary light should be provided by the electric-flash device 7 through the above-mentioned electric-flash circuit 35.

As described above, the CPU 39 is arranged to identify information or the like input by an operator of the camera 1 and sent from the various switches to perform various controls of the entire camera depending on the identification information.

The operation of the camera according to this embodiment will be described below.

A photographer frames a predetermined object in the optical finder 4 and then presses the release switch 10. At this time, a photographing operation is performed under the conditions of a predetermined shutter speed and a predetermined numeral aperture regulated by the aperture 22. Image data acquired in this operation is recorded on the recording medium 33 together with the data of the photographing date.

When a plurality of image data of a predetermined number of frames are recorded on the recording medium 33, various processes can be performed to the plurality of image data according to a predetermined operation mode selected by the mode selection switch 14.

In this embodiment, of the plurality of operation modes which can be executed by the camera, an operation mode which forms a desired synthesized calendar by performing a synthesizing process to a calendar and an image and records the synthesized calendar information on the recording medium 33, i.e., a "calendar function mode" will be described below with reference to the flow charts in FIGS. 6 to 8. Display examples displayed on the liquid-crystal display unit 17 of the camera when the calendar function mode is executed are shown in FIGS. 9 to 22.

Figure 6:
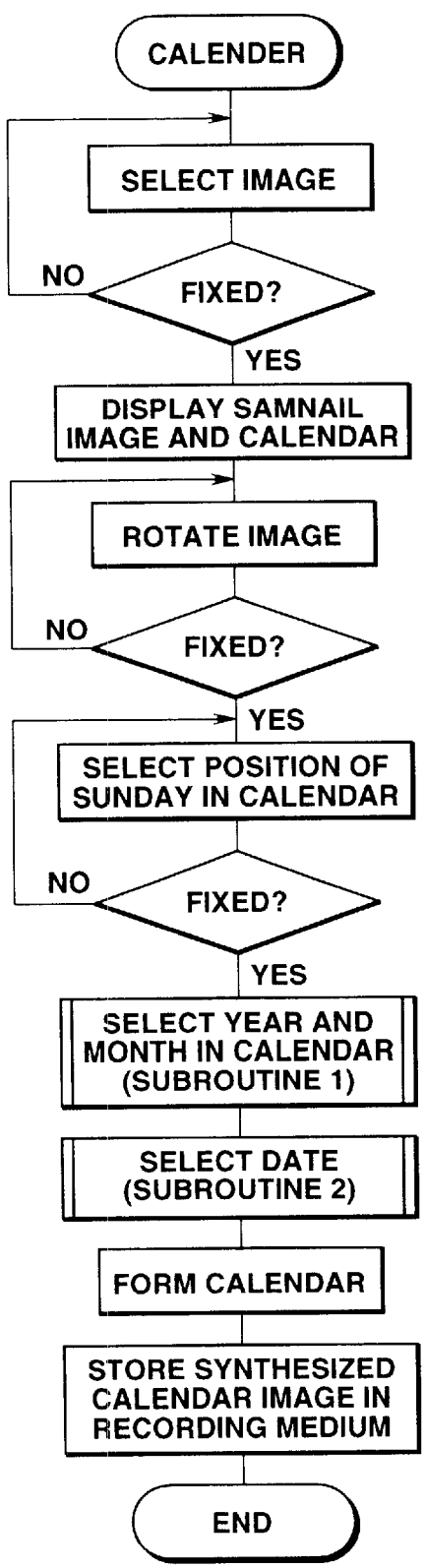
FIG. 6 is a flow chart showing the flow of processes in a calendar function mode in the electronic photographing device in FIG. 1.
Figure 7:
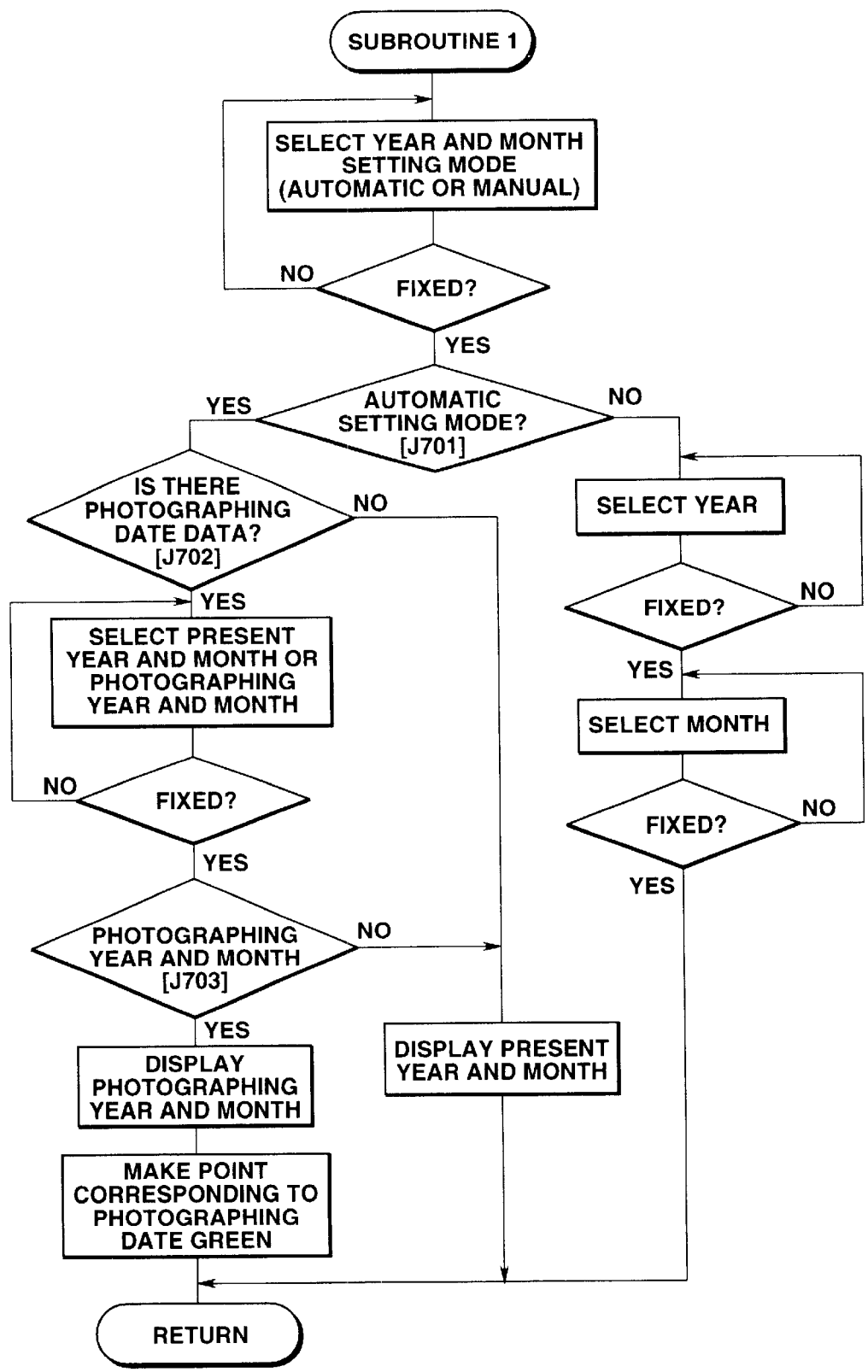
FIG. 7 is a flow chart showing the flow of processes (subroutine 1) for setting the year and month in a calendar made by the processes of FIG. 6 in the electronic photographing device in FIG. 1.

In a state wherein a power is supplied to the camera, and the mode selection switch 14 is pressed to select a calendar function mode while performing a checking operation on the liquid-crystal display unit 16, the camera is then set in a state wherein the camera is operated in the calendar function mode (flow chart in FIG. 6).

When the calendar function mode is set, an image is first selected as shown in FIG. 6. This selection operation is performed in the following manner.

With a shift to the calendar function mode, the image data of the first frame is read from the recording medium 33, and an image corresponding to the image data is displayed on a display screen of the liquid-crystal display unit 17. At this time, each time the increment switch 11 is pressed, the image data of the second et seq. frames are read from the recording medium 33, and images corresponding to the read image data are sequentially displayed on the liquid-crystal display unit 17. When the decrement switch 12 is pressed, the image data of a frame immediately before a frame corresponding to the image displayed on the liquid-crystal display unit 17 is read, and an image corresponding to the read image data is displayed on the liquid-crystal display unit 17.

In this example, each time the increment switch 11 or the decrement switch 12 is pressed, one image is displayed on the liquid-crystal display unit 17. However, additional display forms may also be used as display forms on the liquid-crystal display unit 17.

More specifically, when the calendar function mode is set, image data of a plurality of frames are read from the recording medium 33, and images corresponding to the image data are compressed, so that the plurality of images are displayed on one screen at once. A desired image is selected from the plurality of images.

When such operations are repeated to display a desired image on the liquid-crystal display unit 17, and the fixing switch 13 is pressed, the selected image (so-called thumbnail image obtained by compression) and a prepared calendar image are displayed on the screen of the liquid-crystal display unit 17. The display form obtained at this time, i.e., the image and the calendar image are simultaneously displayed on the liquid-crystal display unit 17 such that the image and the calendar image overlap (see FIG. 9).

In this case, the liquid-crystal display unit 17 is smaller than an ordinary monitor display device such as a CRT. Therefore, in order to display a small letter or the like, the liquid-crystal display unit 17 tends to be lacking in resolution. In particular, numbers and the like of the calendar image cannot be easily read. For this reason, the display of the calendar image cannot give good visual impression.

Therefore, in this embodiment, the letters and numbers of the calendar image displayed on the liquid-crystal display unit 17 in this state are displayed as specific simple symbols, e.g., solid circles (●), so that the entire screen of the liquid-crystal display unit 17 can give a beautiful display which can be easily seen.

Figure 9:
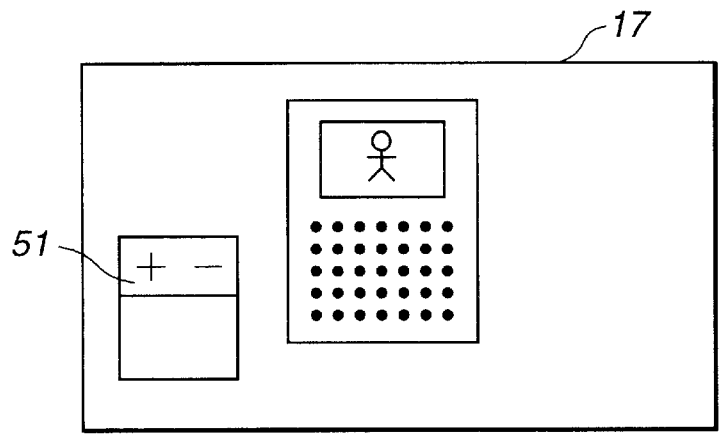
FIG. 9 is a view showing a display example obtained when an image selected from a plurality of image data photographed by the electronic photographing device in FIG. 1 and a calendar image which has been prepared are synthesized with each other to display a synthesized image on a liquid-crystal display unit.

In FIG. 9, a display 51 located at the lower left portion in the display screen of the liquid-crystal display unit 17 is an area for displaying the contents of an operation requested by a camera operator. When various processes are executed, the display 51 makes displays corresponding to the processes.

In this state, for example, when the increment switch 11 is pressed, an image displayed on the liquid-crystal display unit 17 is rotated 90° clockwise each time the switch 11 is pressed. When the decrement switch 12 is pressed, the image is rotated 90° counterclockwise each time the switch 12 is pressed.

Figure 10:
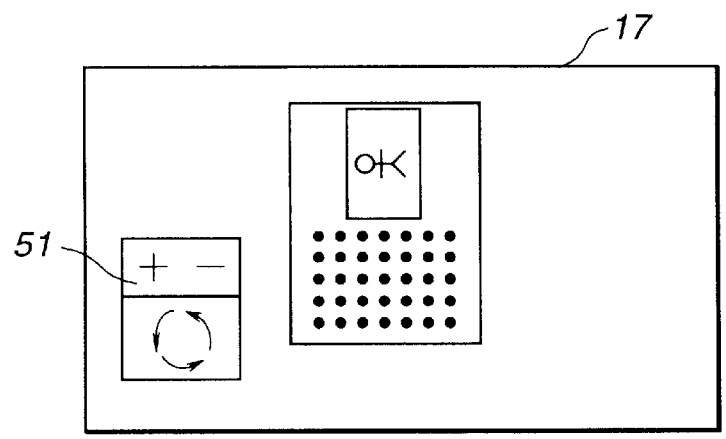
FIG. 10 is a view showing a display example in a state wherein only an image is rotated to be displayed on the liquid-crystal display unit.
Figure 11:
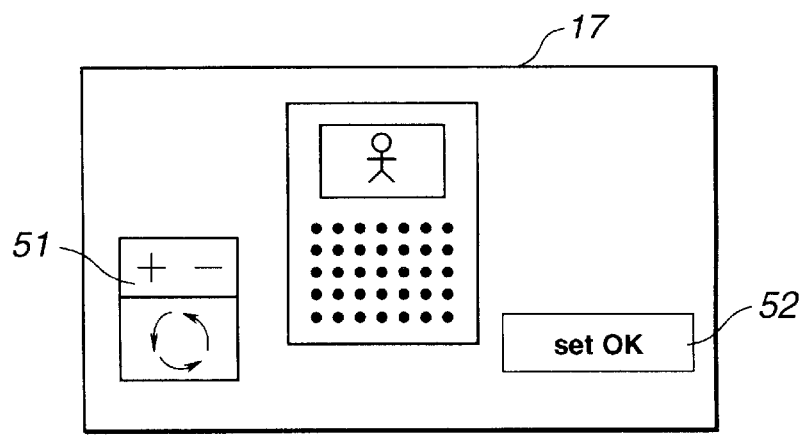
FIG. 11 is a view showing a display example in a state wherein only an image is rotated to be displayed on the liquid-crystal display unit.

FIG. 11 shows a display example obtained when an image displayed on the liquid-crystal display unit 17 shown in FIG. 10 is rotated 90° clockwise by pressing the increment switch 11. At this time, a pictorial symbol or the like representing rotation of an image is displayed on the display 51.

An image is selected by the above operations, and the selected image is displayed on the liquid-crystal display unit 17. After this image is rotated by a predetermined angle in a desired direction, when the fixing switch 13 is pressed, a display 52 representing that setting of a rotation angle of the image is fixed is displayed at the lower right portion in the display screen of the liquid-crystal display unit 17 in FIG. 11.

Next a process of selecting the position of Sunday in a desired calendar to be formed is executed. This process sets the position of Sunday in the calendar is located at the right end or the left end. More specifically, the position of Sunday in the calendar is designed to be freely selected depending on the taste of a user in consideration of the position which changes in different countries or regions.

Figure 12:
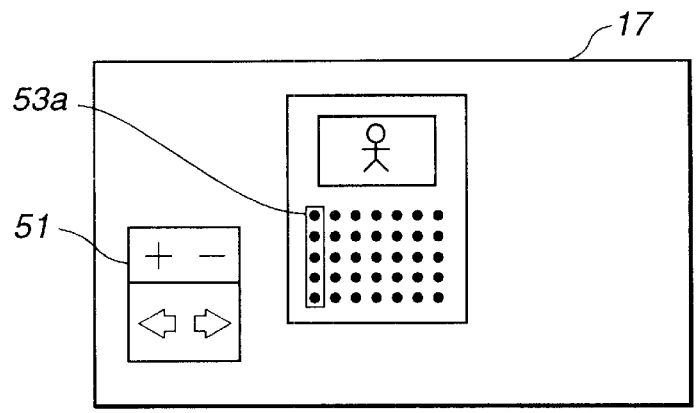
FIG. 12 shows a display example in which the position of Sunday in the calendar is set, and is a view showing a display example obtained when Sunday is set at the left end of the calendar.
Figure 13:
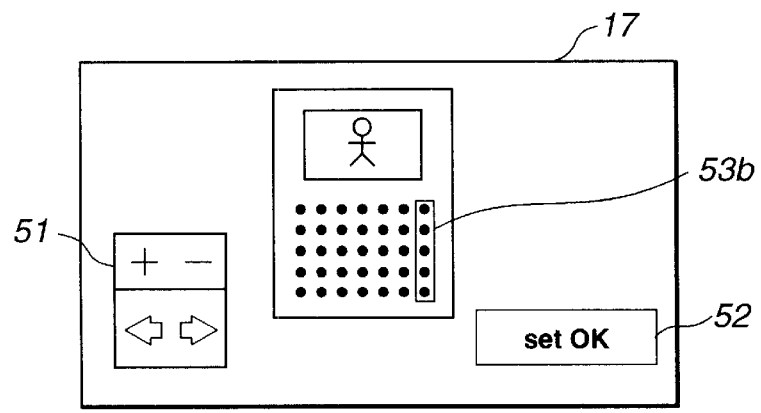
FIG. 13 shows a display example in which the position of Sunday in the calendar is set, and is a view showing a display example obtained when Sunday is set at the right end of the calendar to fix this state.

Here, each time the increment switch 11 or the decrement switch 12 is pressed, the color of the display of one line at the right or left end of the calendar is alternately changed into red or the like representing Sunday (see display portions 53*a* and 53*b* in FIGS. 12 and 13). The other portions are displayed in black.

When a desired position where Sunday placed is displayed by performing such operations and the fixing switch 13 is pressed, the displayed position is fixed as the position where Sunday is displayed (see the display 52 in FIG. 13). The shift to the next operation, i.e., the process of setting the year and month of the calendar is then performed.

FIG. 12 shows a display example obtained when the position of Sunday is located at the left end of the calendar. FIG. 13 shows a display example obtained when the position of Sunday is located at the right end of the calendar and the position is fixed to this position. At this time, a pictorial symbol or the like such as an arrow representing movement of the position of Sunday is displayed on the display 51.

The process of setting the year and month of the calendar is performed next. This process will be described below with reference to subroutine 1 in FIG. 7.

When the year and month of the calendar are set, a setting mode is selected between a mode (automatic setting mode) in which automatic setting is performed and a mode (manual setting mode) in which manual setting is performed.

Figure 14:
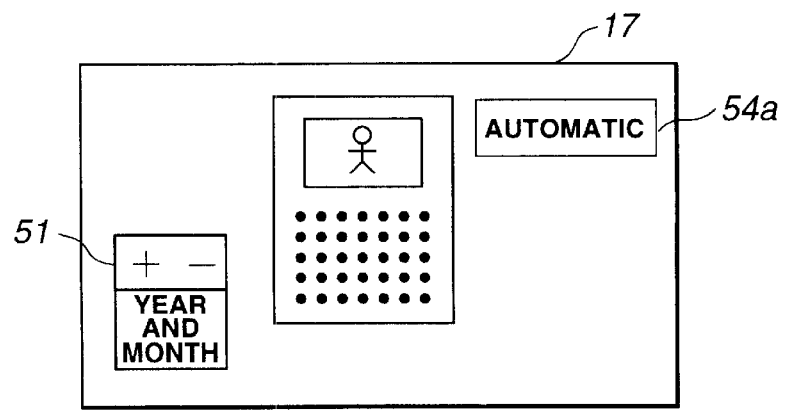
FIG. 14 is a view showing a display example in a state wherein a mode for automatically setting the year and month of a calendar is selected.

During execution of this subroutine 1, when the increment switch 11 or the decrement switch 12 is pressed, displays 54*a* and 54*b* representing a setting mode are displayed at the upper right portion in the display screen of the liquid-crystal display unit 17 each time the operation is performed. FIG. 14 shows a display example of the display 54*a* representing that the automatic setting mode is selected, and FIG. 15 shows a display example of the display 54b representing that the manual setting mode is selected.

Figure 15:
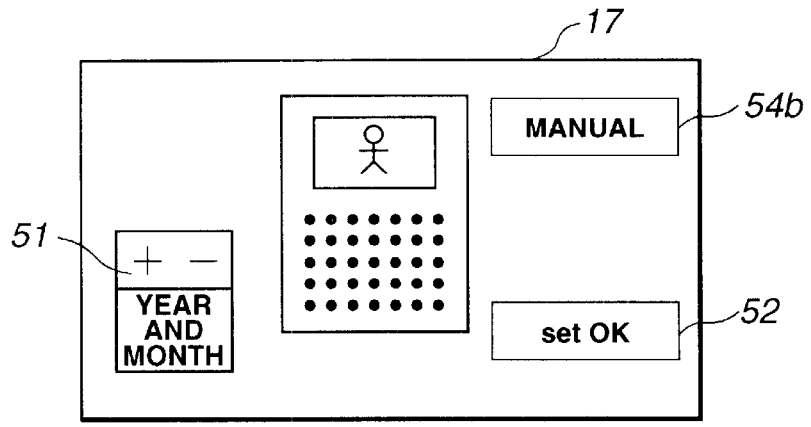
FIG. 15 is a view showing a display example in a state wherein a mode for manually setting the year and month of a calendar is selected.

When any one of the automatic setting mode and the manual setting mode is displayed, and the switch 13 is pressed, the displayed setting mode is fixed (see FIG. 15). The shift to the next operation is then performed. FIG. 15 shows a state wherein the manual setting mode is fixed. At this time, the items to be set, i.e., letters representing a year and a month, are displayed on the display 51.

The process of determining whether the setting mode set by this operation is the automatic setting mode or not is performed. In the following description, for descriptive convenience, this determination process is called [J701].

If it is determined in this process [J701] that the automatic setting mode is selected, the CPU 39 subsequently checks whether the selected and displayed image data includes photographing date data. This check is made because some image data recorded on the recording medium 33 may not include data related to a photographing date. For the same reason as described above, this determination process is called [J702].

As a result of the process [J702], if it is determined that the image data includes photographing date data, a calendar to be displayed is selected between a calendar of the year and month in which the image was photographed and a calendar of the present year and month. This selection is made by operating the increment switch 11 or the decrement switch 12.

Figure 16:
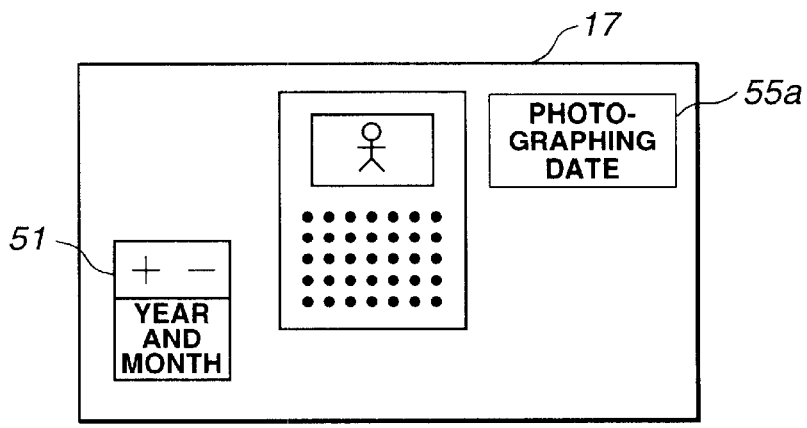
FIG. 16 is a view showing a display example in a state wherein, when the mode for automatically setting the year and month of the calendar is selected, a mode for setting a calendar of the year and month to which a photographing date on which an image is photographed belongs is selected.
Figure 17:
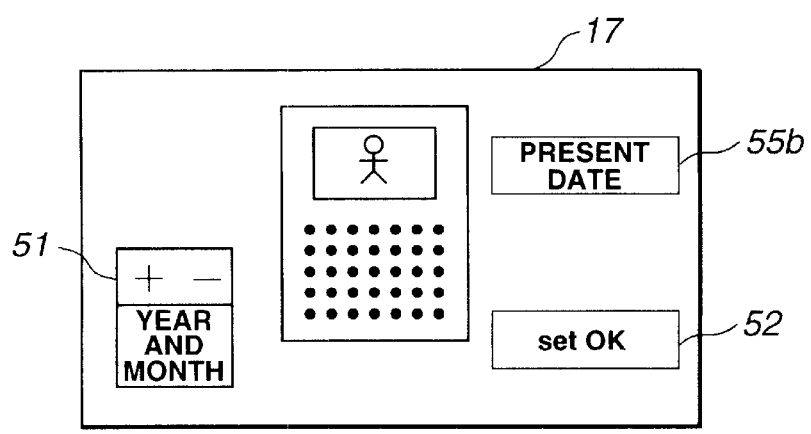
FIG. 17 is a view showing a display example in a state wherein a mode for setting a calendar of the present year and month is set so as to change this information.

More specifically, each time the increment switch 11 or the decrement switch 12 is pressed, a display 55a representing that a mode for displaying a calendar of the year and month of the photographing date is selected is displayed at the upper right portion in the display screen of the liquid-crystal display unit 17 as shown in FIG. 16, and a display 55b representing that a mode for displaying the calendar of the present year and month is selected is displayed as shown in FIG. 17. When any one of the displays 55a and 55b is displayed, and the fixing switch 13 is pressed, the displayed mode is fixed (see the display 52 in FIG. 17), and the shift to the next operation is performed. In this case, as the data of the present year and month, data obtained by a timer incorporated in the CPU 39 of the camera is used.

It is determined whether the selected mode is a mode for displaying the calendar of the year and month of the photographing date. This determination process is called [J703].

Figure 18:
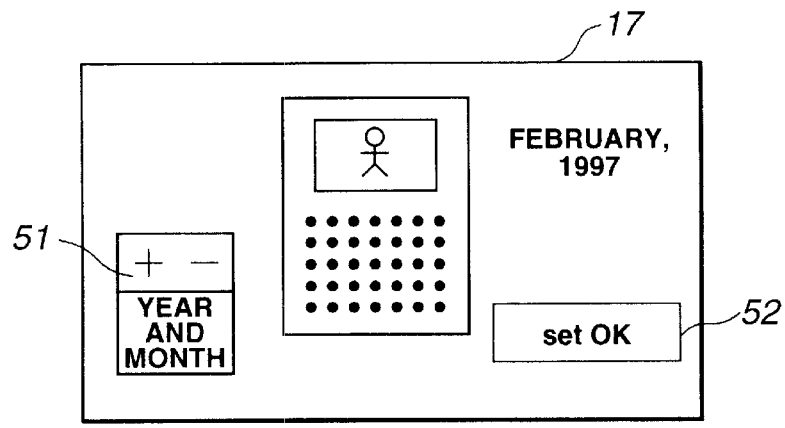
FIG. 18 is a view showing a display example in a state wherein, when the mode for automatically setting the year and month of a calendar is selected, and the mode for setting a calendar of the year and month to a photographing date on which an image is photographed is selected, the year and month are displayed on the liquid-crystal display unit.

As the determination result of the process [J703], if it is determined that the mode for displaying the calendar of the year and month of the photographing date is selected, subsequently, the photographing year and month are displayed at the upper right portion in the display screen of the liquid-crystal display unit 17. FIG. 18 shows a display example obtained when the photographing year and month are [FEBRUARY, 1997].

Here, the color of the photographing date is displayed as a color, e.g., green or the like, which is different from other dates. In FIG. 14, a point (●) at a position corresponding to the photographing date in the calendar is displayed by using a color different from that of the points (●) corresponding to the other dates.

This process is to provide easy visible recognition of the point corresponding to the photographing date. Therefore, in addition to this process, the same point may be flickered.

As shown in FIG. 18, the year and month (see FIG. 18) displayed at the upper right portion on the display screen of the liquid-crystal display unit 17 are not the display form of a calendar image which is finally formed. The year and the month are conventionally and temporarily displayed to form a calendar image.

Upon completion of the above operation, a return from subroutine 1 is made.

If it is determined in the above determination process [J703] that the mode for displaying the calendar of the year and month of the photographing date is not selected, i.e., if it is determined that the mode for displaying the calendar of the present year and month is selected, or if the CPU 39 determines in the above determination process [J702] that there is no photographing date, the present year and month are displayed at the upper right portion in the display screen of the liquid-crystal display unit 17. Upon completion of the above operation, a return from subroutine 1 is made.

Figure 19:
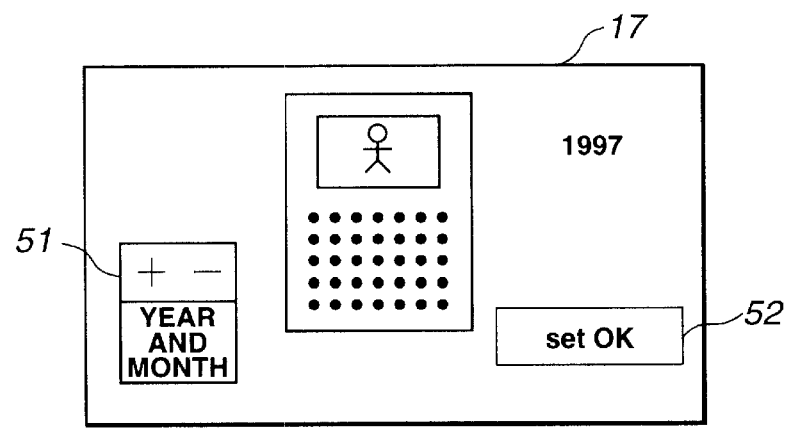
FIG. 19 is a view showing a display example in a state wherein, when the mode for manually setting the year and month of a calendar is selected, the year is manually set.

On the other hand, if it is determined in the above determination process [J701] that the automatic setting mode is not selected, i.e., if it is determined that the manual setting mode is selected, the process of sequentially manually performing year selection and month selection is performed. In this case, as the initial value of the year, the present year may be displayed, or a predetermined specific year may be displayed. FIG. 19 shows a state wherein the initial value of the year is displayed. In this state, when the increment switch 11 is pressed, the value of the number representing this year increases; and when the decrement switch 12 is pressed, the value of the number decreases. In a state wherein a desired year is displayed, when the fixing switch 13 is pressed, setting of the year of a calendar to be formed is fixed.

Figure 20:
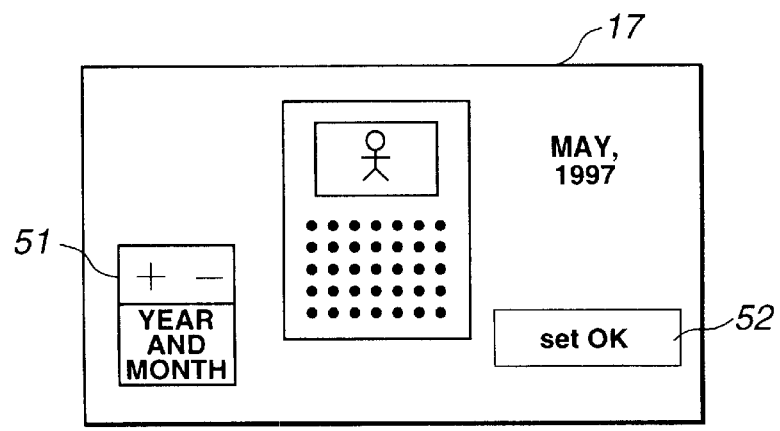
FIG. 20 is view showing a display example in a state wherein, when the mode for manually setting the year and month of a calendar is selected, the month is manually set.
Figure 21:
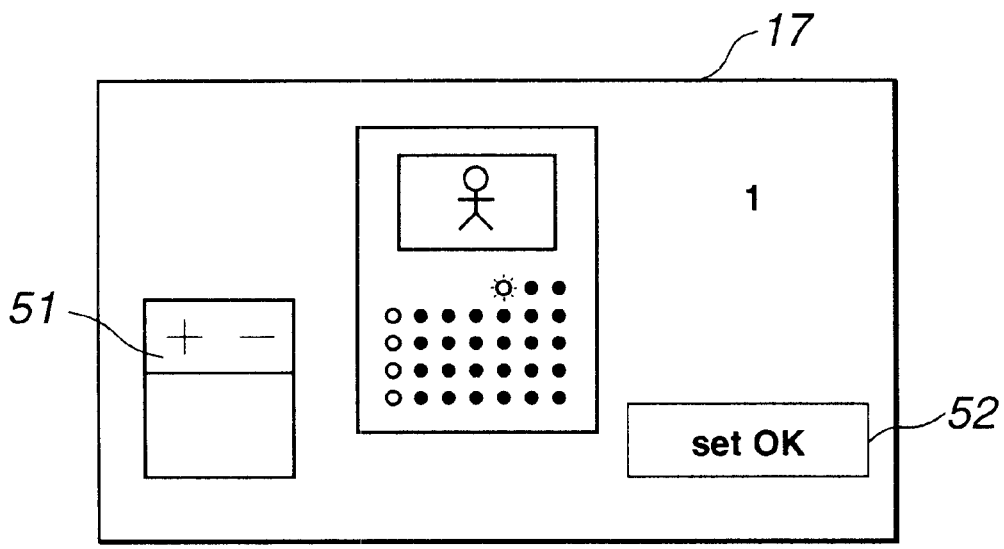
FIG. 21 is a view showing a display example in a state wherein a predetermined date in a calendar is selected, the number of the date is displayed, and the color of the predetermined date is set as a color different from that of the other dates.

The month is set in the same manner as that of the selection of the year (see FIG. 20). When the desired year is fixed, a return from subroutine 1 is made. The processes of subroutine 1 are executed as described above.

When the return from subroutine 1 is made, the flow returns to FIG. 6, and a subroutine (the process is called subroutine 2) for performing the process of changing the color of the date of the calendar into a color different from the color of the other dates is executed.

Here, the subroutine 2 will be described below with reference to FIG. 8.

The color of the date representing the photographing data among the dates displayed in a calendar to be formed is set to be a color different from the color of the other dates in the above-described manner.

The process of the subroutine 2 is the process of setting the color of a specific date, e.g., in addition to data related to the photographing date, a wedding anniversary or the day of an entrance ceremony, to be a predetermined color. This process allows such dates to be manually selected and designated by an operator.

Figure 8:
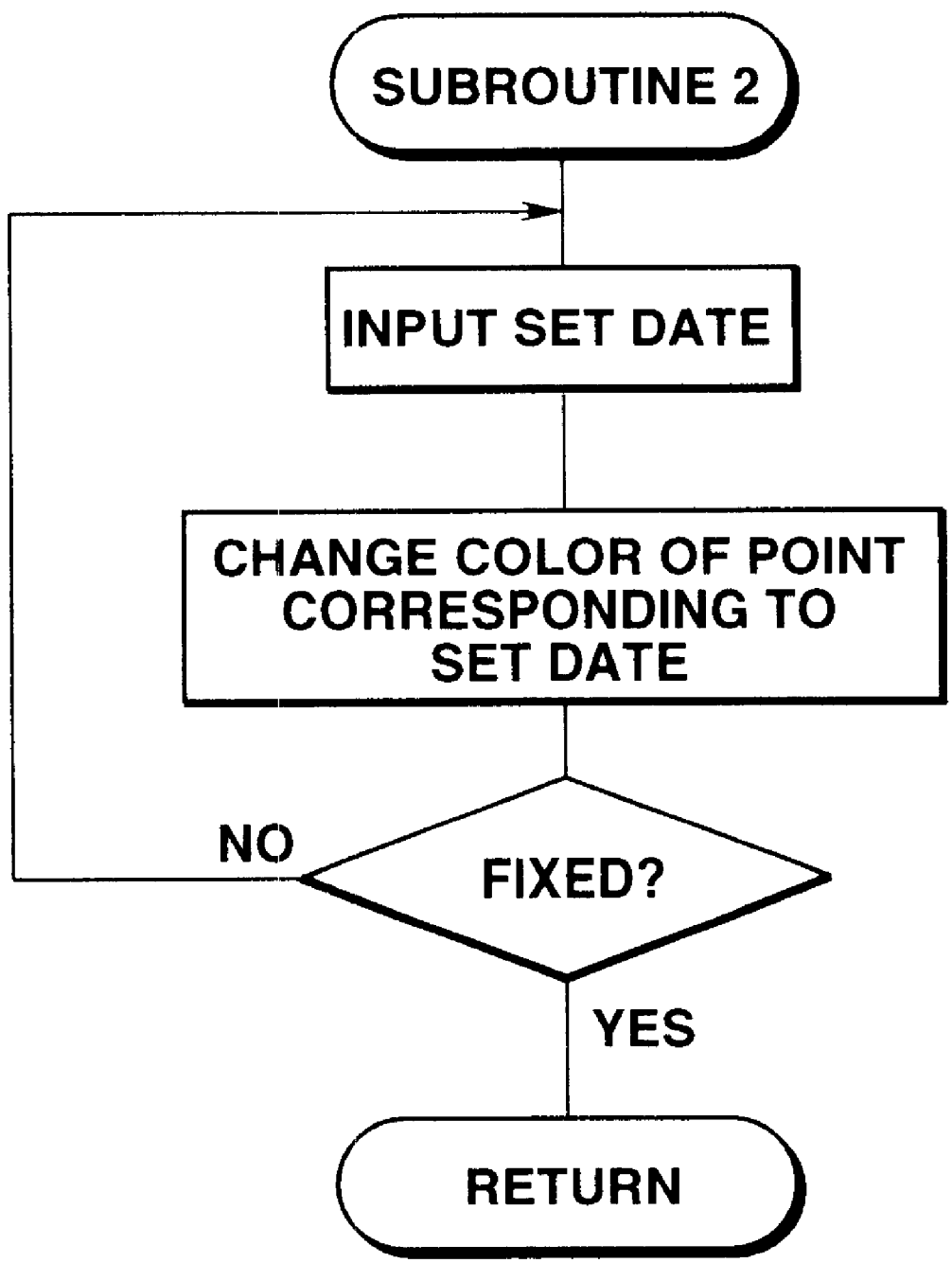
FIG. 8 is a flow chart showing the flow of processes (subroutine 2) for setting the color of a date in the processes of FIG. 6 in the electronic photographing device in FIG. 1.

When the shift to subroutine 2 is performed, as shown in FIG. 8, an initial value of date designation in the calendar, e.g., "1", is displayed at a predetermined position, e.g., at the upper right portion in the display screen of the liquid-crystal display unit 17 (see FIG. 21), and the color of the point of the date in the calendar corresponding to the day is set as a color which is different from the color of the other dates.

At this time, the dates in the calendar displayed on the display screen of the liquid-crystal display unit 17 are represented by points (●) displayed at corresponding positions as described above. Since the points (●) are too small to be easily recognized, the points are flickered at once. In this manner, recognition of the mode for setting the colors of dates is made easy.

In this state, a desired date is selected by pressing the increment switch 11 or the decrement switch 12. When the fixing switch 13 is pressed, the color of the set date is set to be a color different from the color of the other dates and is then fixed.

Upon completion of the above operation, a return from subroutine 2 is made.

Figure 22:
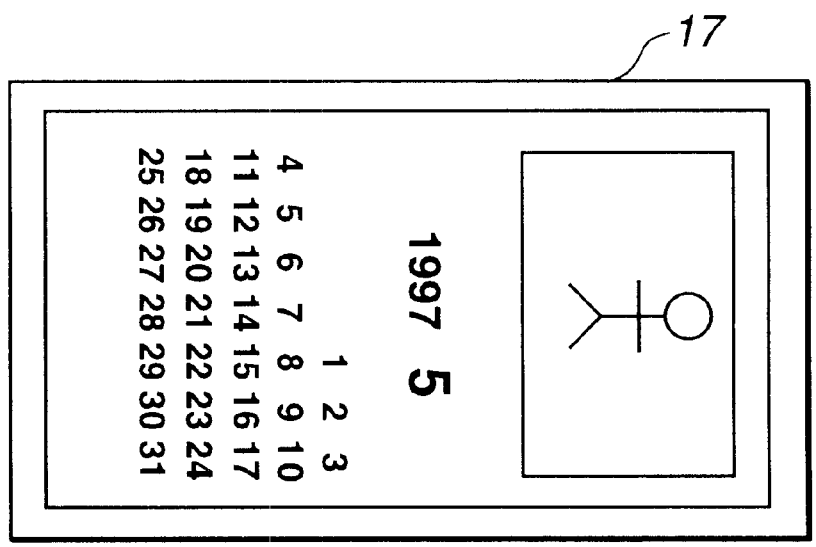
FIG. 22 is a view showing a display example in a state wherein a final synthesized calendar image is displayed on the liquid-crystal display unit.

Returning to FIG. 6, when the operation of subroutine 2 is completed, a calendar is formed on the basis of a photographed image input by the above operations and information such as a rotation angle at which the image is arranged, the year and month of the calendar, a position where Sunday is arranged in the calendar image, and a date whose color is set to be different from the color of the other dates, of the calendar. As shown in FIG. 22, by using the almost entire area on the display screen of the liquid-crystal display unit 17, a synthesized calendar image is displayed (see FIG. 22).

The data of the synthesized calendar which is finally formed is recorded on the recording medium 33. Data related to the synthesized calendar is recorded on the recording medium 33. More specifically, synthesized image data corresponding to the synthesized calendar image including the image displayed on the liquid-crystal display unit 17 and the basic calendar image is recorded on the recording medium 33 as new image data.

The image data corresponding to the image photographed by the camera and the data corresponding to the calendar image are not recorded in a separate form, but recorded as single synthesized image data, so that files can be simply managed.

Since the synthesized image data of the calendar image is recorded as the latest image, when a reproducing display operation is performed immediately after the synthesized calendar image is formed, the synthesized calendar image which was just formed is reproduced. For this reason, a formation result can be easily confirmed.

The present invention is not limited to this embodiment, and the following arrangement may be employed. That is, for example, the various data which are set in the formation of a synthesized calendar image such as image data corresponding to a photographed image, a rotation angle at which the image is arranged, the year and month of the calendar, a position where Sunday is arranged in the calendar image, and a date or the like whose color is set to be different from the color of the other dates of the calendar, and identification data or the like representing the correspondence between these data and image data, may be independently recorded on the recording medium 33.

With this arrangement, a synthesized calendar image is formed on the basis of a relatively highly precise image data which is originally recorded on the recording medium 33 and the data set to form the synthesized calendar image. For this reason, when the synthesized calendar image is enlarged to be printed using a printer, a more high-quality image can be obtained.

In this embodiment, image data corresponding to an image photographed by a photographing means is compressed by the JPEG format and recorded on the recording medium 33. However, synthesized image data corresponding to a synthesized calendar image between an image and a calendar image which are set in a predetermined display form by the above-described various operations is also compressed by the JPEG format and is recorded in the same recording format as described above.

In this manner, a compression/expansion circuit can be shared in recording the image data corresponding to the photographed image and in recording the synthesized image data. For this reason, the processor of the camera and software can be easily simplified.

Predetermined editing operations such as operations for erasing the synthesized image data, write-protecting the data to prevent the image data from being erased, and displaying an image corresponding to the synthesized image data on a display device can be handled like an image in photographing. For this reason, the processor of the camera and software can be simplified as described above.

In this invention, it is apparent that a wide range of different working modes can be formed on this basis of this invention without departing from the spirit and scope of the invention. This invention is not restricted by any specific embodiment except being limited by the appended claims.

What is claimed is:

1. An integrated electronic photographing device for producing and formatting a synthesized calendar image, said device comprising:
   a photographing subsystem for photographing an object; and
   a recording medium on which image data corresponding to a plurality of images photographed by said integrated electronic photographing device can be recorded,
   wherein the integrated electronic photographing device contains therewithin:
     a selector that selects image data from the image data corresponding to said plurality of images recorded on said recording medium;
     a calendar signal generator that generates a calendar signal;
     a display for synthesizing an image corresponding to the image data selected by said selector with a calendar corresponding to the calendar signal and for displaying the synthesized image, wherein the calendar displayed on said display has dates which are represented by specific symbols other than numbers;
     an operation unit for setting a format of the image or the calendar displayed on said display; and
     a recorder that records synthesized image data corresponding to the synthesized image of the image and the calendar displayed on said display.

2. An electronic photographing device according to claim 1, wherein said operation unit includes a unit to rotate the image displayed on said display by a predetermined angle.

3. An electronic photographing device according to claim 1, wherein said operation unit includes an indicator to indicate a selection of whether the left end of the calendar displayed on said display is Sunday or Monday.

4. An electronic photographing device according to claim 1, wherein said operation unit includes a unit to set the color of a predetermined date in the calendar displayed on said display to be a color different from that of the other dates in the calendar.

5. An electronic photographing device according to claim 4, wherein the predetermined date is a photographing date of the image displayed on said display.

6. An electronic photographing device according to claim 1, wherein said operation unit includes a unit to set a year and month of the calendar displayed on said display means to be a predetermined year and a predetermined month.

7. An electronic photographing device according to claim 1, wherein the calendar displayed on said display comprises a year and a month, the year and month being initially set to a year and a month corresponding to the photographing date of the image displayed on said display.

8. An electronic photographing device according to claim 1, wherein the calendar displayed on said display comprises a year and a month, the year and month being initially set to the present year and month.

9. An electronic photographing device according to claim 1, wherein a recording format used when the image data corresponding to the plurality of images photographed by said integrated photographing device is recorded on said recording medium and a recording format used when the synthesized image data corresponding to the synthesized image of the image and the calendar formatted by said operation unit is recorded on said recording medium are the same recording format.

10. An electronic photographing device according to claim 1, wherein said camera further comprises a plurality of operation elements which control a plurality of format settings of the synthesized calendar image.

11. An electronic photographing device according to claim 10, wherein said selection element is additionally configured to set a selected format setting obtained by controlling said operation elements.

12. An electronic photographing device according to claim 10, wherein one of said format settings controlled by said plurality of operation elements is a rotational position of the selected image.

13. An electronic photographing device according to claim 10, wherein one of said format settings controlled by said plurality of operation elements is a configurational positioning of Sunday in said synthesized calendar image.

14. An electronic photographing device according to claim 10, wherein one of said format settings controlled by said plurality of operation elements is a selection of the predetermined month and year of said synthesized calendar image.

15. An electronic photographing device according to claim 14, wherein said month and year of said synthesized calendar image can be selected to be the predetermined month and year as generated by said calendar generator.

16. An electronic photographing device according to claim 10, wherein one of said format settings controlled by said plurality of operation elements is a designation of a particular date within the calendar displayed in the display element to be a different color from the remainder of dates in the calendar displayed in the display element.

* * * * *

UNITED STATES PATENT AND TRADEMARK OFFICE
CERTIFICATE OF CORRECTION

PATENT NO. : 6,741,278 B1
DATED : May 25, 2004
INVENTOR(S) : Toyofuku et al.

It is certified that error appears in the above-identified patent and that said Letters Patent is hereby corrected as shown below:

Title page,
Item [73], Assignee, should read as follows:
-- [73] Assignee: Olympus Corporation (JP) and Sanyo Electric Co., Ltd. (JP) --

Signed and Sealed this

Thirtieth Day of November, 2004

JON W. DUDAS
*Director of the United States Patent and Trademark Office*